Sept. 26, 1933.  O. H. GOODELL  1,928,352
BALL BEARING
Filed Oct. 8, 1931
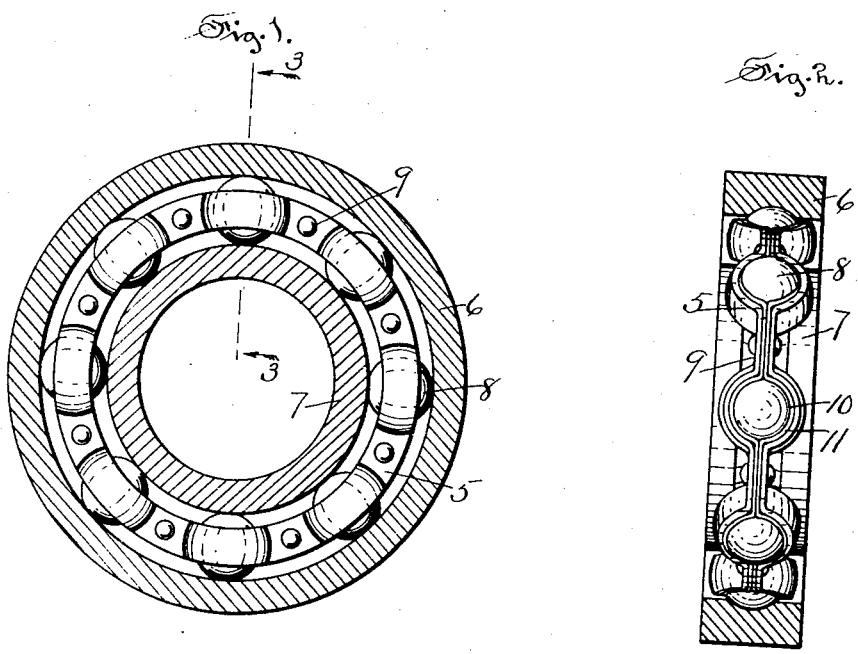
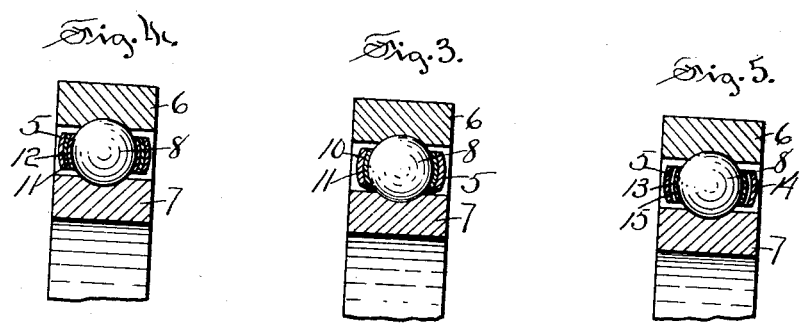
INVENTOR
Oscar H. Goodell
by
Arthur B. Jenkins,
ATTORNEY Patented Sept. 26, 1933

1,928,352

UNITED STATES PATENT OFFICE 1,928,352

BALL BEARING

Oscar H. Goodell, Hartford, Conn.

Application October 8, 1931. Serial No. 567,595

2 Claims. (Cl. 308—201)

My invention relates to that class of devices which are employed to reduce friction between rotating parts, and an object of my invention, among others, is the provision of a ball bearing having a ball separator that shall be particularly efficient as to the feature of wear and also as to the amount of friction created, the latter being reduced to a minimum.

One form of a bearing embodying my invention and in the construction and use of which the objects herein set out, as well as others, may be attained, is illustrated in the accompanying drawing, in which—

Figure 1 is a sectional view of my improved ball bearing.

Figure 2 is a view in section on a plane located at right angles to the plane of view of Figure 1 the separator being shown in full in both views.

Figure 3 is a view in section through one side of the bearing on a plane denoted by the dotted line 3—3 of Figure 1.

Figure 4 is a similar view illustrating a modification, and

Figure 5 is another similar view illustrating still another modification.

In order to obtain efficiency in ball bearings it is essential that means shall be provided for keeping the balls in spaced relation and this is common practice. However this practice introduces an element of friction which it is the intention of the bearing to eliminate, and it is the purpose of the present invention to reduce this friction in ball separators to a minimum, such feature being shown in the accompanying drawing in which the numeral 6 denotes the outer and the numeral 7 the inner members of a ball bearing of ordinary construction having a ball race between them in which the balls 8 travel in a manner readily understood.

A ball separator comprises two strips 5 of thin metal each formed of annular shape with equally spaced recesses, each recess being of a depth substantially equal to half the circumference of a ball so that when joined as by rivets at the points 9 intermediate the recesses sockets 10 are formed each to enclose a ball. The structures thus far described are separators of old and well known construction and of themselves do not constitute my present invention but when combined with the features now to be described my invention becomes apparent.

This improvement consists in providing a lining 11 of copper or similar metal that will reduce the friction and hence the heating to a minimum. This lining is made of annular form corresponding to that of each of the parts hereinbefore described, two lining members fitted within the outer members being employed for each separator.

The structure just described answers my purpose to a satisfactory extent but I have found that if the lining be so constructed that it may give or yield to a limited degree increased advantages will be obtained. To this end, in some cases, I introduce an intermediate and yielding or cushioning strip 12 of the same general form as the lining strips 11 and fitted to lie between such linings and the outside parts of the separator and as shown in Figure 4 of the drawing. While these cushioning members may be composed of various materials that will have the desired yielding or cushioning qualities I have found lead to satisfactorily answer my purpose.

I have also found that this same result may be obtained by making the socket portion of the inner or lining members 13 somewhat smaller than the outer members 14 so that there will be a slight space or spaces 15 between the lining and outer member of the separator and as shown in Figure 5 of the drawing.

This construction not only provides a ball separator having a lining encasing the balls to minimize the friction, but such lining is permitted to yield or give under the action of the balls and thereby further decrease the frictional action.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim:

1. A ball bearing including an outer and an inner member, a separator comprising an annular member with spaced sockets, a lining in each of said sockets, cushioning material between the lining and outer part of the separator, and balls located in said sockets.

2. A separator for ball bearings comprising two outer members of similar and annular shape formed to provide spaced sockets, lining members and cushioning members of the same general shape as the outer members, and means for securing all of said members together with the cushioning members between the lining and outer members.

OSCAR H. GOODELL.